United States Patent
Radhakrishnan et al.

(10) Patent No.: US 12,399,699 B2
(45) Date of Patent: Aug. 26, 2025

(54) SYSTEMS AND METHODS FOR PERFORMING HEALTH SCORE-BASED FIRMWARE UPDATES

(71) Applicant: Dell Products, L.P., Round Rock, TX (US)

(72) Inventors: Vineeth Radhakrishnan, Palakkad (IN); Dharma Bhushan Ramaiah, Bangalore (IN); Mini Thottunkal Thankappan, Bangalore (IN); Rama Rao Bisa, Bangalore (IN); Shinose Abdul Rahiman, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 411 days.

(21) Appl. No.: 17/934,653

(22) Filed: Sep. 23, 2022

(65) Prior Publication Data

US 2024/0103825 A1   Mar. 28, 2024

(51) Int. Cl.
*G06F 8/65* (2018.01)

(52) U.S. Cl.
CPC ..................... *G06F 8/65* (2013.01)

(58) Field of Classification Search
CPC ................. G06F 8/65; G06F 8/654
USPC ........................................ 717/168
See application file for complete search history.

(56) References Cited

U.S. PATENT DOCUMENTS

| | | | |
|---|---|---|---|
| 10,409,584 B1* | 9/2019 | Kulchytskyy et al. ... | G06F 8/65 |
| 10,642,623 B1* | 5/2020 | Righi et al. ............... | G06F 8/65 |
| 11,093,321 B1* | 8/2021 | Zeavelou et al. ......... | G06F 8/65 |
| 2015/0160627 A1* | 6/2015 | Maddukuri et al. ...... | G06F 8/65 700/90 |
| 2016/0036956 A1* | 2/2016 | Debates et al. ........... | G06F 8/65 455/419 |
| 2020/0019393 A1* | 1/2020 | Vichare .................. | G06N 20/00 |
| 2020/0034133 A1* | 1/2020 | Dattatri .................... | G06F 8/65 |
| 2020/0372157 A1* | 11/2020 | Singer et al. ............. | G06F 8/64 |
| 2020/0387390 A1* | 12/2020 | Bat Ulzii .............. | G06F 40/274 |
| 2023/0017316 A1* | 1/2023 | Kulkarni .................. | G06N 5/04 |

\* cited by examiner

*Primary Examiner* — Qing Chen
(74) *Attorney, Agent, or Firm* — Fogarty LLP

(57) ABSTRACT

Embodiments of the present disclosure provide a firmware update to multiple, similar hardware devices in an Information Handling System (IHS). In an illustrative, non-limiting embodiment, an IHS may include computer-executable instructions to receive a request to perform a firmware update to a plurality of devices, update a first of the plurality of devices with the requested firmware update, and calculate a health score for the first device as a result of the first device being updated. Based upon the health score, the system and method may determine whether to update the other devices based at least in part, on the determined health score, and update the other devices based on the determination.

17 Claims, 6 Drawing Sheets

SYSTEMS AND METHODS FOR PERFORMING HEALTH SCORE-BASED FIRMWARE UPDATES

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

Nowadays, software updates are typically made available on one or more download sites as soon as the software provider can produce them. In this manner, software providers can be more responsive to critical flaws, security concerns, and general customer needs. As a result, to update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer.

SUMMARY

Embodiments of the present disclosure provide a firmware update to multiple, similar hardware devices in an Information Handling System (IHS). In an illustrative, non-limiting embodiment, an IHS may include computer-executable instructions to receive a request to perform a firmware update to a plurality of devices, update a first of the plurality of devices with the requested firmware update, and calculate a health score for the first device as a result of the first device being updated. Based upon the health score, the system and method may determine whether to update the other devices based at least in part, on the determined health score, and update the other devices based on the determination.

According to another embodiment, a health score-based firmware updating method includes the steps of receiving a request to perform a firmware update to a plurality of devices, updating a first of the plurality of devices with the requested firmware update, and calculating a health score for the first device as a result of the first device being updated, Based on the determined health score, the method further includes the steps of determining whether to update the other devices based at least in part, on the determined health score, and updating the other devices based on the determination.

According to yet another embodiment, a memory storage device is configured with program instructions that, upon execution by a client Information Handling System (IHS), cause the client IHS to receive a request to perform a firmware update to a plurality of devices, update a first of the plurality of devices with the requested firmware update, and calculate a health score for the first device as a result of the first device being updated. Based on the determined health score, the instructions further cause the IHS to determine whether to update the other devices based at least in part, on the determined health score, and update the other devices based on the determination.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Customers often upgrade the firmware in the IHSs of a data center for assorted reasons, such as to meet compliance policies, to take advantage of new features, enhancements, deploy security fixes, and the like. The IHSs that are NVMe-MI/PLDM Specification compliant can take advantage of updating firmware in parallel to all IHSs in a system or in a cluster without rebooting the servers. The devices which support Platform Level Data Model (PLDM) offers an option for the Remote Access Controller (RAC) to update the firmware without rebooting the HOST server. Thus, downtime is often not incurred during the firmware update process.

In a cluster environment or other system where multiple PLDM compliant devices (IHSs) belonging to same vendor exist, there is a possibility that a firmware update may be triggered for all the devices in an IHS concurrently. The firmware update may, in some cases, cause certain issues that were not observed during development of the firmware update (e.g., in a test environment). Examples of such issues may include a different run time environment (e.g., mismatch between in-band driver and side-band firmware), configuration-based issues, side band issues, etc.). These unwanted issues can damage or bring down the cluster or system on which the firmware update was performed. As will be described in detail herein below, embodiments of the present disclosure provide a health score-based firmware updating system and method that performs a firmware update on a single IHS, and calculates a health score for that IHS. Using the calculated health score, either the user (cluster administrator) or system may determine whether to perform the firmware update on the other IHSs in the cluster.

Figure 1A:
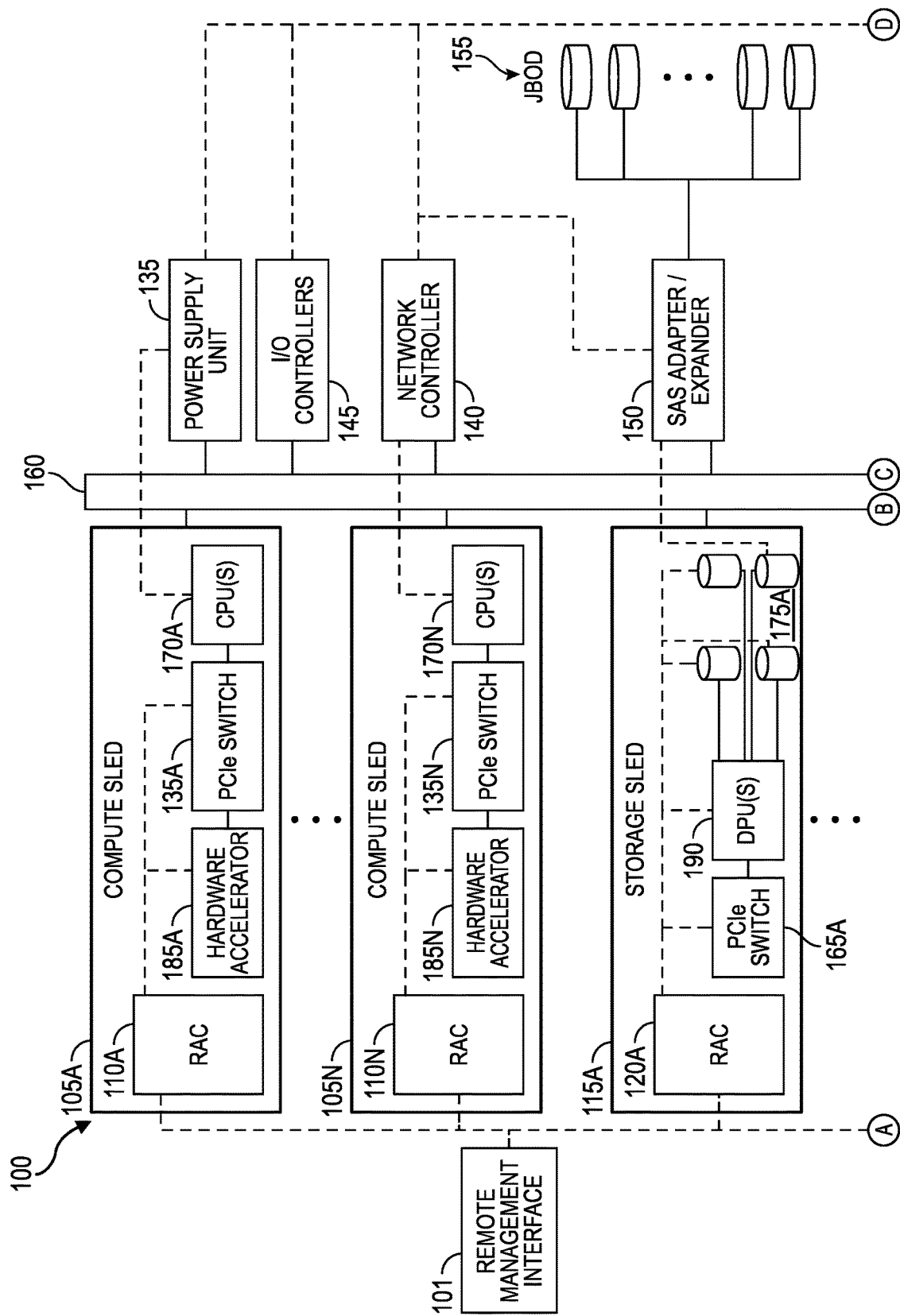
FIGS. 1A and 1B illustrate certain components of a chassis comprising one or more compute sleds and one or more storage sleds that may be configured to implement the systems and methods described according to one embodiment of the present disclosure.
Figure 1B:
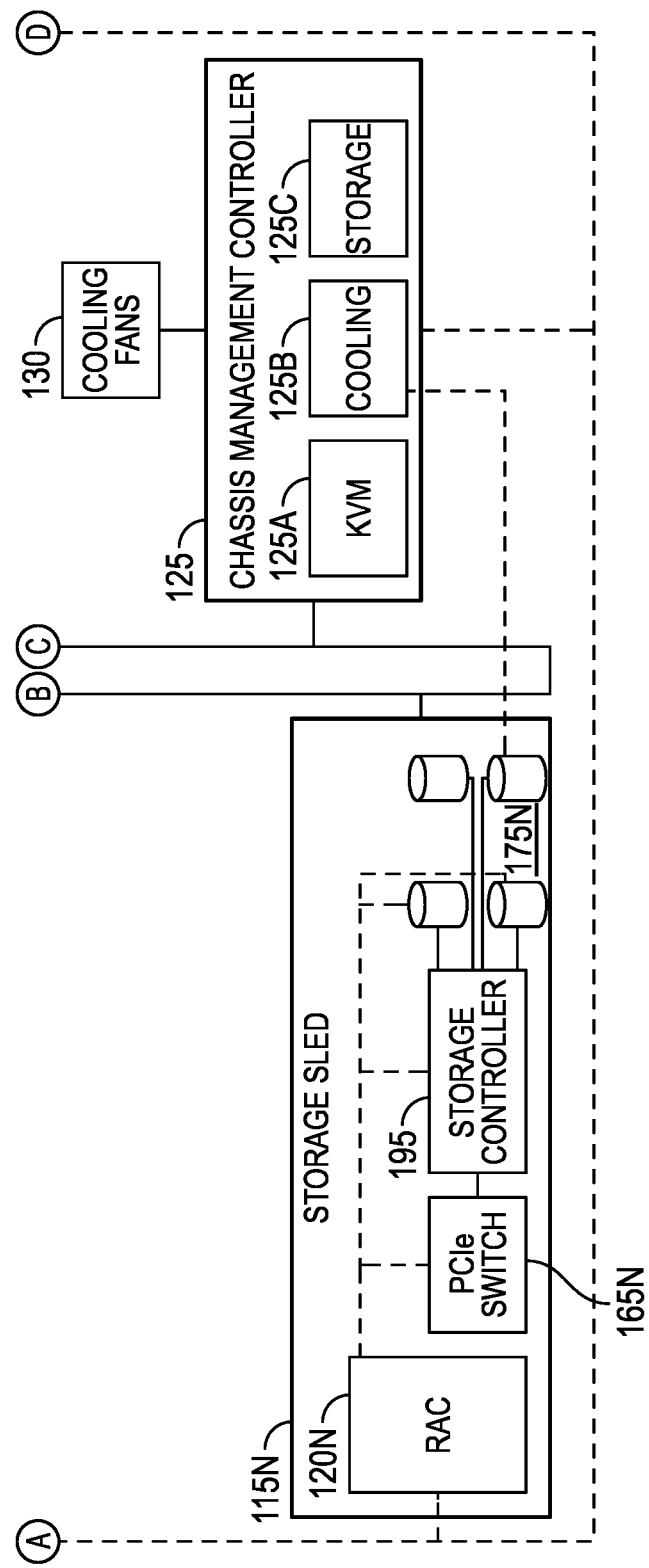

FIGS. 1A and 1B illustrate certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 may include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
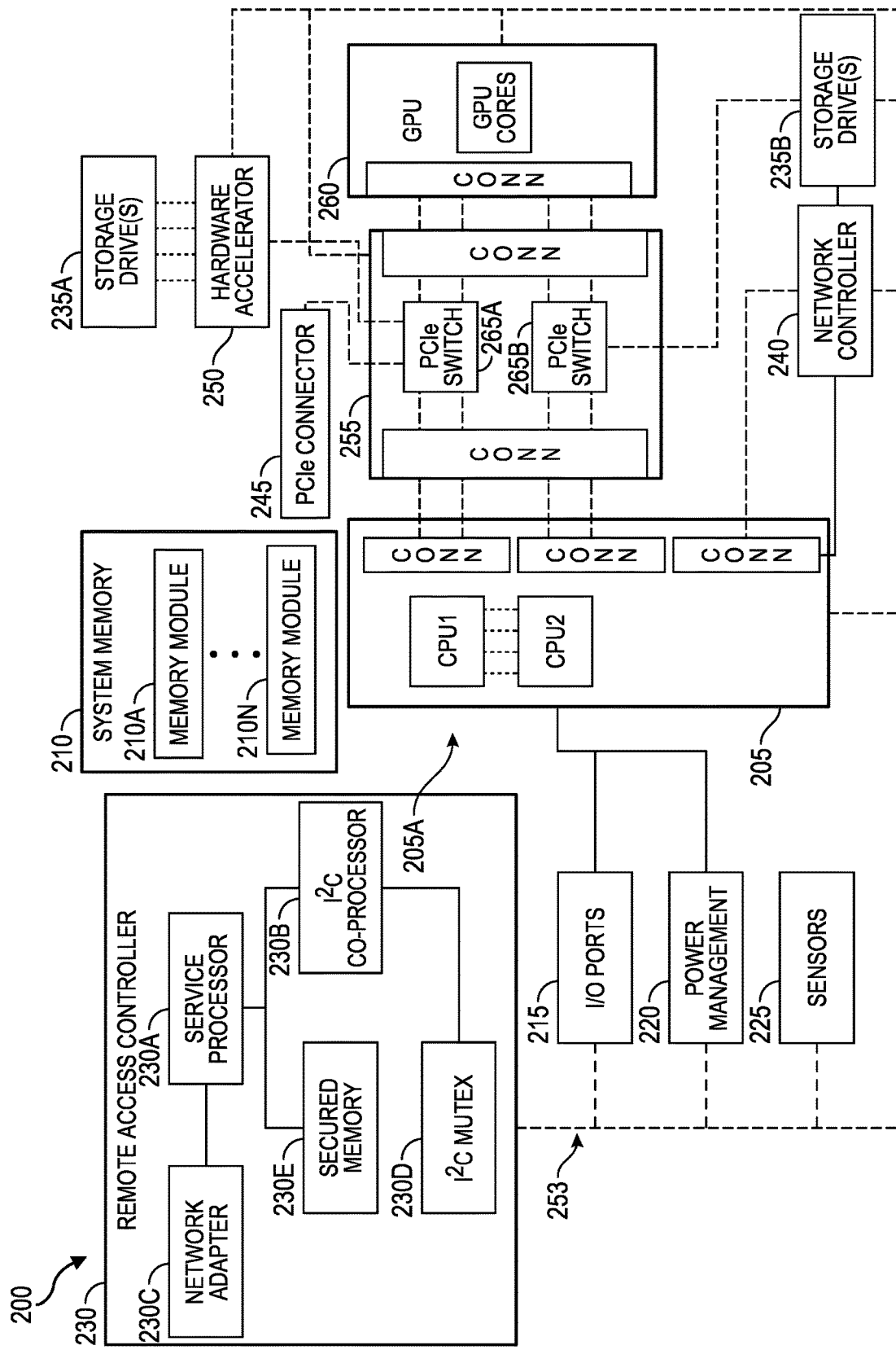
FIG. 2 illustrates an example IHS configured to implement systems and methods described herein according to one embodiment of the present disclosure.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sled 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous storage drives 175a. These storage drives 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage drives 155 may be accessed via a SAS expander 150 that is coupled to the backplane 160 of the chassis 100. The SAS expander 150 may support connections to a number of JBOD (Just a Bunch of Disks) storage drives 155 that, in some instances, may be configured and managed individually and without implementing data redundancy across the various storage drives 155. The additional storage drives 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of storage drives of the same manufacturer and model. Accordingly, any firmware updates to storage drives 175a-n, 155 require the updates to be applied within each of these topologies being supported by the chassis 100. Despite the substantial number of different storage drive topologies that may be supported by an individual chassis 100, the firmware used by each of these storage devices 175a-n, 155 may be occasionally updated. In some instances, firmware updates may be limited to a single storage drive, but in other instance, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the storage drives 155 configured in a JBOD.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n, or other type of server, such as an 1 RU server installed within a 2 RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated.

As illustrated, PCIe switch 265*a* is coupled via a PCIe link to a hardware accelerator 250, such as a DPU, Smart-NIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator 250 may operate according to firmware instructions that may be occasionally updated.

In the illustrated embodiment, the programmable capabilities of hardware accelerator 250 implement functions used to support storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support of high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs 260 may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230*a*, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230*e* for exclusive use by the remote access controller in support of management operations.

In some embodiments, remote access controller 230 may implement monitoring and management operations using MCTP (Management Component Transport Protocol) messages that may be communicated to managed devices 205, 235*a-b*, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265*a-b*. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
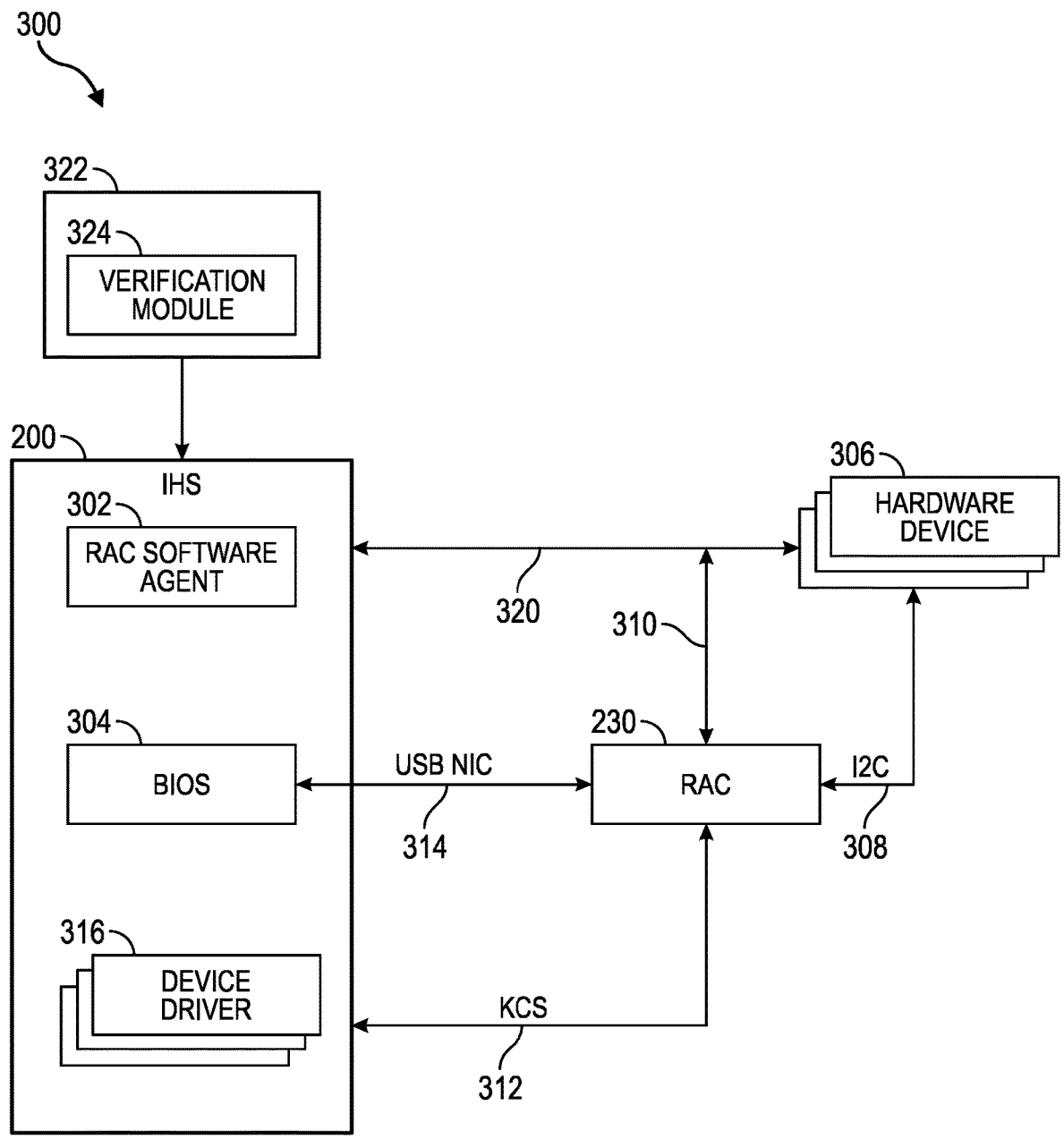
FIG. 3 is a diagram illustrating several components of an example associated IHS showing how those components may signal one another for implementing the health score-based firmware updating system and method according to one embodiment of the present disclosure.

FIG. 3 is a diagram 300 illustrating several components of an example associated IHS 200 showing how those components may signal one another for implementing the health score-based firmware updating system and method according to one embodiment of the present disclosure. The IHS 200 is shown with a RAC software agent 302 and a basic input output system (BIOS) 304, and one or more device drivers 316 that are each associated with one of multiple hardware devices 306. The hardware devices 306 may be any IHS configurable device, such as a graphics processing card, a network interface card, an input/output (I/O) (e.g., USB) expansion port card, a Wi-Fi interface card, a storage controller card, and the like. For example, the hardware devices 306 may be a hardware accelerator 250, a storage drive 235a, an I/O port 215, a network controller 240, such as described herein above with reference to FIG. 2. Some, most, or all hardware devices 306 communicate with the IHS 200 via system bus 320, which in one embodiment, may include a Peripheral Component Interconnect Express (PCIe) bus.

The RAC 230 may communicate with each of multiple hardware devices 306 via an i2c connection 308 such as described above. In other embodiments, the RAC 230 may communicate with each of the hardware devices 306 using other communication protocols, such as i3c SENSEWIRE connections, or serial peripheral interface (SPI) based connections. Additionally, the RAC 230 may also communicate with each of the hardware devices 306 through the system bus 320 using a Management Component Transport Protocol (MCTP) PCIe vendor defined message (VDM) channel 310.

The RAC 230 may also communicate with the IHS 200 through the PCIe VDM channel 310, a Keyboard Controller Style (KCS) channel 312, and/or a USB NIC channel 314. The KCS channel 312 is provided as part of an intelligent platform management interface (IPMI) specification. In general, the IPMI specification defines several system interfaces for local access from the RAC software agent 302 and BIOS 304 to the RAC 230 of which the KCS protocol provides an ideal connection that does not require authentication for its operation.

The RAC software agent 302 is a lightweight software service that is executed on the host IHS 200 to integrate certain operating system (OS) features with the RAC 230. The RAC software agent 302 provides OS-related information to the RAC 230, and may add capabilities such as LC log event replication into the OS log, WMI support (including storage), iDRAC SNMP alerts via OS, iDRAC hard reset and remote full Power Cycle. For example, the RAC software agent 302 may be an iDRAC Service Module (iSM) that is configured to operate with the integrated Dell remote access controller (iDRAC), which are both provided by DELL TECHNOLOGIES.

The IHS 200 may receive a firmware update 322 that is to be installed on multiple hardware devices 306. The firmware update 322 may include a verification module 324 that includes information for verifying the firmware update 322 following its installation on a hardware device 306. If the IHS 200 is PLDM compliant, it can take advantage of updating firmware in parallel (e.g. concurrently) to all hardware devices 306 without rebooting the servers. This feature, however, may present a problem for IHSs 200 that have multiple hardware devices 306. For example, if the firmware update 322 exhibits problems after installation, the firmware update 322 for each of the multiple hardware devices 306 needs to be rolled back, thus yielding excessive downtime and customer dissatisfaction. Embodiments of the present disclosure provide a solution to this problem by performing a firmware update on a single IHS, calculate a health score for that IHS, and using the calculated health score, determine whether to perform the firmware update on the other hardware devices in the IHS.

Figure 4A:
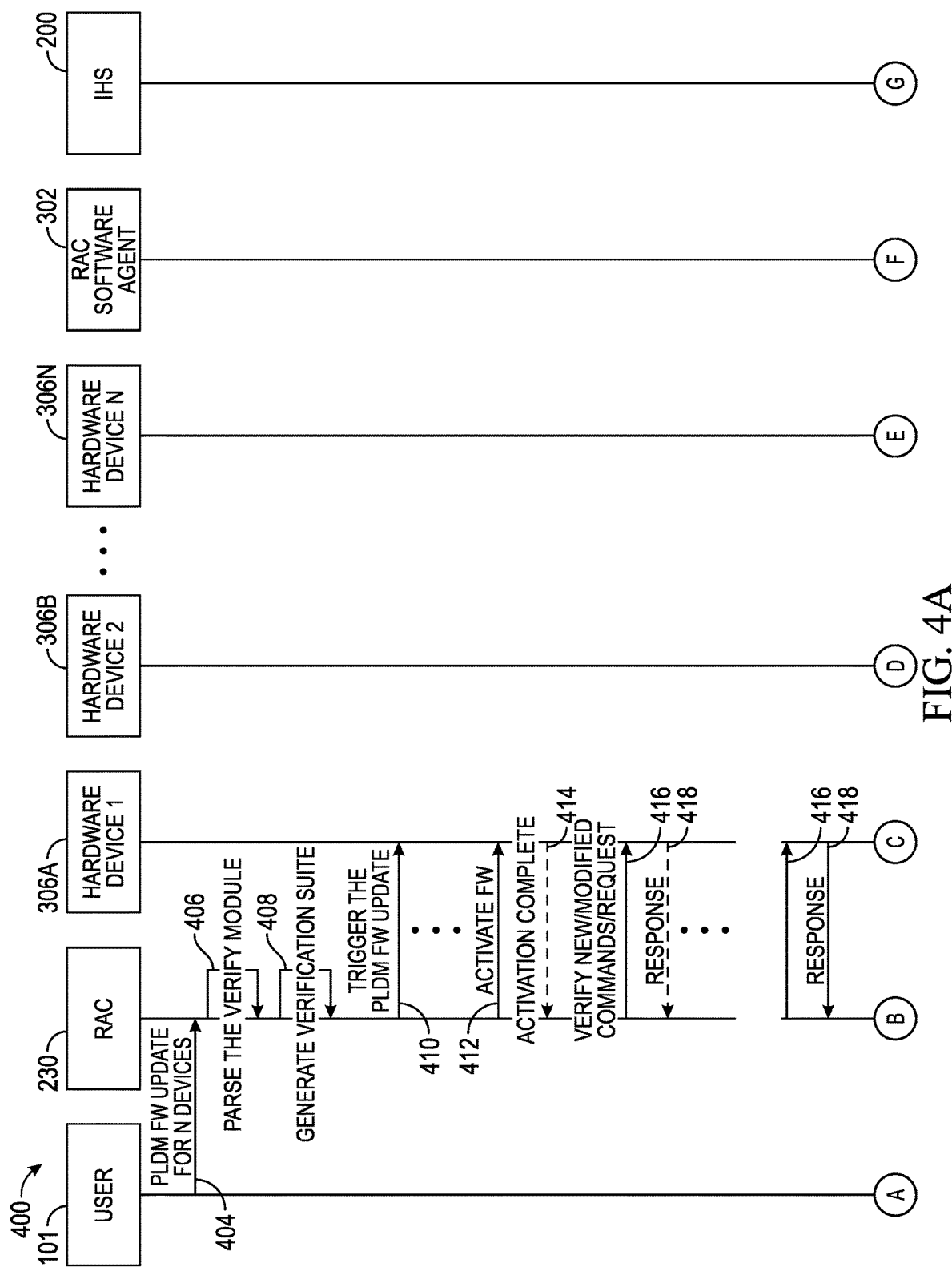
FIGS. 4A and 4B illustrate a health score-based firmware updating method depicting how the hardware devices of the IHS may receive a firmware update according to one embodiment of the present disclosure.
Figure 4B:
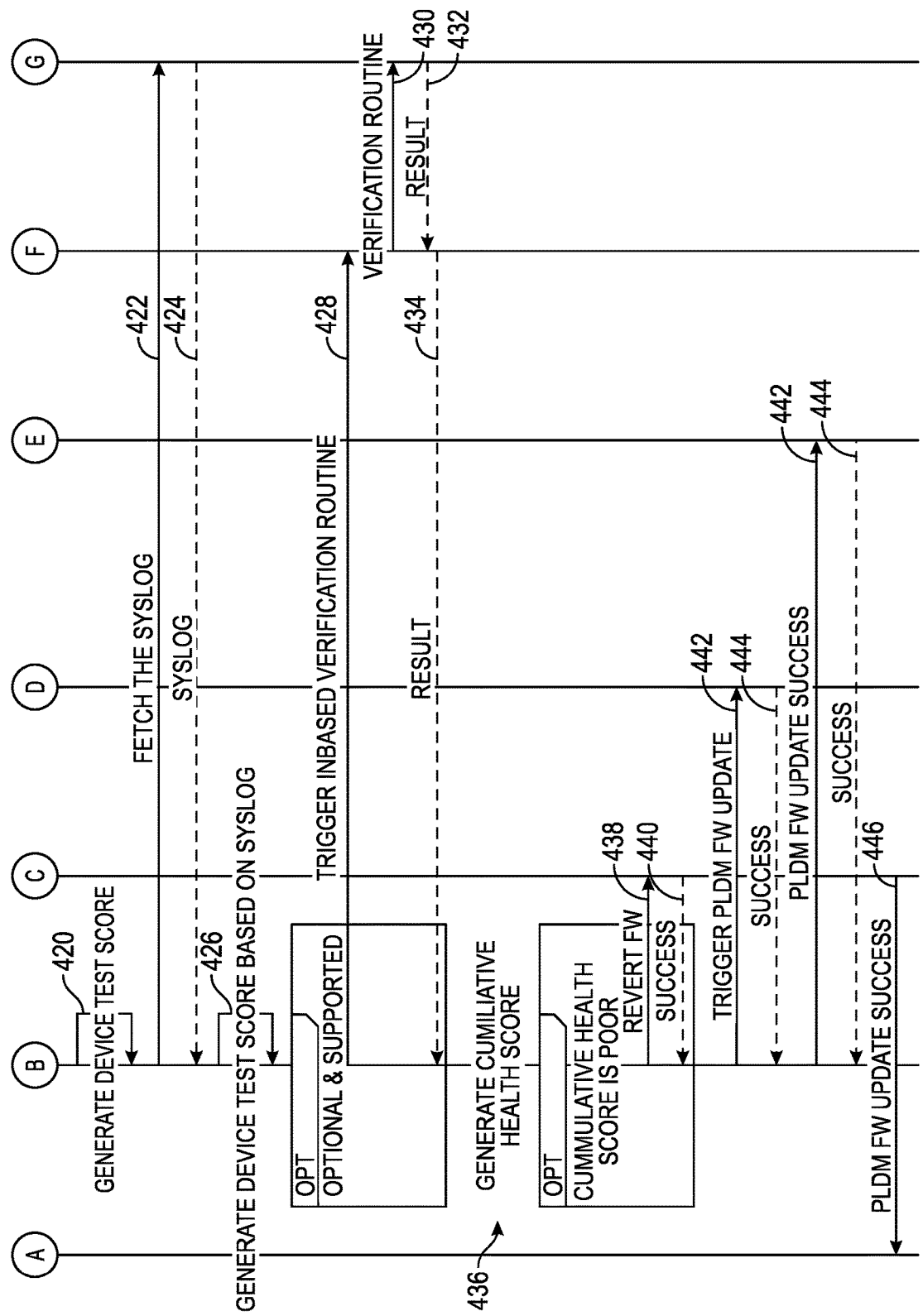

FIGS. 4A and 4B illustrate a health score-based firmware updating method 400 depicting how the hardware devices 306a-n of the IHS 200 may receive a firmware update according to one embodiment of the present disclosure. In one embodiment, the health score-based firmware updating method 400 may be performed in whole, or in part, by the RAC 230 described herein above. Within this example method 400, all of the hardware devices 306a-n are of the same type. That is, each of the hardware devices 306a-n are configured to be updated using the same firmware update 322. Initially, a firmware update 322 (e.g., a new software package or an updated version of an existing software package) is promoted or made available by a provider of the hardware device 306 that the firmware update 322 package supports.

Initially at step 404, a user communicates with the RAC 230 via Remote Management Interface 101 to initiate a firmware update to the relevant hardware devices 306a-n of the IHS 200. When the RAC 230 receives the firmware update 322, it parses the verification module 324 to obtain one or more verification criteria at step 406, and generates a verification suite at step 408. The criteria may be any type that can be used to verify that the hardware devices 306a-n function properly with the firmware update 322. Examples of such criteria may include, for example, a particular sideband interface that the hardware devices 306a-n support, any new commands and/or requests that are supported by the hardware devices, a list of modified commands and/or requests added to the firmware, a list of mandatory commands that the hardware devices are to support, any expected results for the commands and/or requests issued to the hardware devices, and an expected performance for certain CPU intensive operations (e.g. log retrieval).

Steps 410-420 describe actions that may be performed to verify one or more test commands (e.g., new commands/requests or modified commands/requests). At step 410, the RAC 230 begins a firmware update process for one of the hardware devices 306a-n. Whereas the user via Remote Management Interface 101 may have requested that all of the hardware devices 306a-n receive the same firmware update 322, the RAC 230 commences the firmware update on only one hardware device 306a for reasons that will be explained in detail herein below. When the firmware update process is completed, the RAC 230 will activate the one device 306a at step 412 in which the hardware device 306a responds by sending an activation complete message back to the RAC 230 at step 414.

At step 416, the RAC 230 issues a test command to the hardware device 306a to verify one criterion from among the criteria that was parsed and generated previously at steps 406 and 408. Thereafter at step 418, the RAC 230 receives a response to the test command. The RAC 230 performs a similar verification steps for the other criteria. In one embodiment, certain verification criteria tests may be conducted sequentially, while in other embodiments, certain other verification criteria tests may be conducted in parallel. The RAC 230 may then calculate a test score based upon a cumulative results of the test commands at step 420. In some embodiments, the results of certain test commands may be weighted according to their relative importance to the overall health score of the firmware update 322.

Steps 422-426 describe actions that may be performed to verify the operation of the hardware device 306a based upon information stored in a syslog of the IHS 200. At step 422, the RAC 230 fetches a syslog from the IHS 200, and at step 424, it receives the requested syslog from the IHS 200. In general, the syslog may store information about any of the test commands that did, or did not, pass the tests. The RAC 230 may use such information to calculate another device test score based upon the information stored in the syslog. At step 426, the RAC 230 generates a device test score based on the syslog.

Steps 428-434 describe actions that may be performed to verify in-band communications (via RAC software agent 302) between the RAC 230 and the hardware device 306a. Nevertheless, it should be appreciated that steps 428-434 need not be performed, for example, if the hardware device 306a does not need or use any in-band communication operations. At step 428, the RAC 230 issues an in-band verification routine to the RAC software agent 302 which in turn, forwards it to the IHS 200 at step 430. The in-band verification routine may include any type of suitable logic for verifying the integrity of the in-band communication link between the RAC 230 and hardware device 306a. For example, the in-band verification routine may be configured to send arbitrary placeholder text (e.g., dummy data) that is compared with a known copy of the placeholder text to verify proper operation of the in-band communication link. At step 432, the RAC software agent 302 receives the result of the routine, and forwards it onto the RAC 230 at step 434.

At step 436, the RAC 230 calculates a cumulative score based on the score calculated for the test commands, syslog, and in-band verification routine. In other embodiments, the RAC 230 may calculate the cumulative score based on a portion of the aforedescribed interim scores. In one example, the cumulative score may be based only on the test commands, while in another example, the cumulative score may be based on the test commands and the in-band verification routine.

In one embodiment, the RAC 230 may display the cumulative score for view by the user via the Remote Management Interface 101, and receive user input for determining whether to install the firmware update 322 on the other hardware devices 306b-n. The RAC 230 may also receive user input for determining whether to revert (e.g., roll back) the firmware update 322 from the first hardware device 306a. For example, if the score is poor, the RAC 230 may issue a request to revert the firmware update 322 in the first hardware device 306a at step 438 in which the hardware device 306a responds with a revert success message at step 440.

If, however, the score is good, the RAC 230 may trigger an update to the other hardware devices 306b-n at step 442 using the firmware update 322 in which the hardware devices 306b-n respond with respective update success messages at step 444. When all of the other hardware devices 306b-n have been successfully updated with the firmware update 322, the RAC 230 send a firmware update success message to the Remote Management Interface 101 at step 446.

The aforedescribed method 400 can be performed each time a firmware update 322 is to be installed on multiple hardware devices 306a-n of the IHS 200. Nevertheless, when use of the health score-based firmware updating method 500 is no longer needed or desired, the method 500 ends.

Although FIG. 4 describes one example of a process that may be performed to update the hardware devices 306a-n of the same type in an IHS 200, the features of the disclosed process may be embodied in other specific forms without deviating from the spirit and scope of the present disclosure. For example, certain steps of the disclosed processes may be performed sequentially, or alternatively, they may be performed concurrently. As another example, the method 400 may perform additional, fewer, or different operations than those operations as described in the present example. As yet another example, the steps of the processes described herein may be performed by a system other than the RAC 230, such as by a cloud service existing in the cloud network that communicates remotely with the IHS 200.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
at least one processor; and
at least one memory coupled to the at least one processor, the at least one memory having program instructions stored thereon that, upon execution by the at least one processor, cause the IHS to:
receive a request to perform a firmware update to a plurality of devices;
identify one or more new or modified commands available in the requested firmware update;
update a first device of the plurality of devices with the requested firmware update;
issue each of the one or more new or modified commands to the first device of the plurality of devices;
verify whether a response to the one or more new or modified commands was successful;
calculate a health score for the first device of the plurality of devices based at least in part on the successful response of the one or more new or modified commands, as a result of the first device of the plurality of devices being updated;
determine whether to update other devices of the plurality of devices with the requested firmware update based at least in part on the calculated health score for the first device of the plurality of devices; and
in response to the determining, update the other devices of the plurality of devices with the requested firmware update based at least in part on the calculated health score for the first device of the plurality of devices.

2. The IHS of claim 1, wherein the program instructions, upon execution by the at least one processor, further cause the IHS to:
fetch a syslog from the IHS, wherein the syslog comprises information associated with one or more errors reported about the first device of the plurality of devices after being activated with the requested firmware update; and
further calculate the health score for the first device of the plurality of devices based at least in part on a relevance of the one or more reported errors to the one or more new or modified commands.

3. The IHS of claim 1, wherein the program instructions, upon execution by the at least one processor, further cause the IHS to:
communicate with the first device of the plurality of devices via an in-band communication link, wherein the in-band communication link is performed using a Peripheral Component Interconnect Express (PCIe) protocol; and
further calculate the health score for the first device of the plurality of devices based at least in part on any errors reported due to the communication with the first device of the plurality of devices via the in-band communication link.

4. The IHS of claim 3, wherein the program instructions are stored and executed on a Remote Access Controller (RAC) configured in the IHS.

5. The IHS of claim 4, wherein the program instructions, upon execution by the at least one processor, further cause the IHS to communicate with the first device of the plurality of devices via a RAC service module executed on the IHS.

6. The IHS of claim 1, wherein the program instructions, upon execution by the at least one processor, further cause the IHS to:
when the calculated health score for the first device of the plurality of devices exceeds a specified threshold, update the other devices of the plurality of devices with the requested firmware update; and
when the calculated health score for the first device of the plurality of devices does not meet the specified threshold, roll back the requested firmware update on the first device of the plurality of devices.

7. The IHS of claim 1, wherein the program instructions, upon execution by the at least one processor, further cause the IHS to:
display the calculated health score for the first device of the plurality of devices for view by a user; and
receive user input for determining whether to update the other devices of the plurality of devices with the requested firmware update.

8. The IHS of claim 1, wherein the requested firmware update comprises a Platform Level Data Model (PLDM)-based firmware update.

9. A health score-based firmware updating method comprising:
   receiving a request to perform a firmware update to a plurality of devices;
   identifying one or more new or modified commands available in the requested firmware update;
   updating a first device of the plurality of devices with the requested firmware update;
   issuing each of the one or more new or modified commands to the first device of the plurality of devices;
   verifying whether a response to the one or more new or modified commands was successful;
   calculating a health score for the first device of the plurality of devices based at least in part on the successful response of the one or more new or modified commands, as a result of the first device of the plurality of devices being updated;
   determining whether to update other devices of the plurality of devices with the requested firmware update based at least in part on the calculated health score for the first device of the plurality of devices; and
   in response to the determining, updating the other devices of the plurality of devices with the requested firmware update based at least in part on the calculated health score for the first device of the plurality of devices.

10. The health score-based firmware updating method of claim 9, further comprising:
    fetching a syslog from an Information Handling System (IHS), wherein the syslog comprises information associated with one or more errors reported about the first device of the plurality of devices after being activated with the requested firmware update; and
    further calculating the health score for the first device of the plurality of devices based at least in part on a relevance of the one or more reported errors to the one or more new or modified commands.

11. The health score-based firmware updating method of claim 9, further comprising:
    communicating with the first device of the plurality of devices via an in-band communication link, wherein the in-band communication link is performed using a Peripheral Component Interconnect Express (PCIe) protocol; and
    further calculating the health score for the first device of the plurality of devices based at least in part on any errors reported due to the communication with the first device of the plurality of devices via the in-band communication link.

12. The health score-based firmware updating method of claim 11, further comprising communicating with the first device of the plurality of devices via a Remote Access Controller (RAC) service module executed on an Information Handling System (IHS).

13. The health score-based firmware updating method of claim 9, further comprising:
    when the calculated health score for the first device of the plurality of devices exceeds a specified threshold, updating the other devices of the plurality of devices with the requested firmware update; and
    when the calculated health score for the first device of the plurality of devices does not meet the specified threshold, rolling back the requested firmware update on the first device of the plurality of devices.

14. The health score-based firmware updating method of claim 9, further comprising:
    displaying the calculated health score for the first device of the plurality of devices for view by a user; and
    receiving user input for determining whether to update the other devices of the plurality of devices with the requested firmware update.

15. A memory storage device having program instructions stored thereon that, upon execution by one or more processors of a client Information Handling System (IHS), cause the client IHS to:
    receive a request to perform a firmware update to a plurality of devices;
    identify one or more new or modified commands available in the requested firmware update;
    update a first device of the plurality of devices with the requested firmware update;
    issue each of the one or more new or modified commands to the first device of the plurality of devices;
    verify whether a response to the one or more new or modified commands was successful;
    calculate a health score for the first device of the plurality of devices based at least in part on the successful response of the one or more new or modified commands, as a result of the first device of the plurality of devices being updated;
    determine whether to update other devices of the plurality of devices with the requested firmware update based at least in part on the calculated health score for the first device of the plurality of devices; and
    in response to the determining, update the other devices of the plurality of devices with the requested firmware update based at least in part on the calculated health score for the first device of the plurality of devices.

16. The memory storage device of claim 15, wherein the program instructions, upon execution by the one or more processors, further cause the client IHS to:
    fetch a syslog from the client IHS, wherein the syslog comprises information associated with one or more errors reported about the first device of the plurality of devices after being activated with the requested firmware update; and
    further calculate the health score for the first device of the plurality of devices based at least in part on a relevance of the one or more reported errors to the one or more new or modified commands.

17. The memory storage device of claim 15, wherein the program instructions, upon execution by the one or more processors, further cause the client IHS to:
    communicate with the first device of the plurality of devices via an in-band communication link, wherein the in-band communication link is performed using a Peripheral Component Interconnect Express (PCIe) protocol; and
    further calculate the health score for the first device of the plurality of devices based at least in part on any errors reported due to the communication with the first device of the plurality of devices via the in-band communication link.

* * * * *